United States Patent

[11] 3,632,475

[72] Inventors Kaname Sugimoto
Okayama-shi;
Mikihiko Yoshida, Okayama; Masashi Kurimoto, Okayama-shi, all of Japan
[21] Appl. No. 817,560
[22] Filed Apr. 18, 1969
[45] Patented Jan. 4, 1972
[73] Assignee Hayashibara Company
Okayama-shi, Okayama, Japan
[32] Priority Apr. 30, 1968
[33] Japan
[31] 43/29243

[54] PROCESS FOR PREPARING LONG-CHAIN AND SHORT-CHAIN AMYLOSES FROM STARCHES
13 Claims, No Drawings

[52] U.S. Cl. .................................................. 195/31,
127/71
[51] Int. Cl. ................................................... C12b 1/00
[50] Field of Search ......................................... 195/2, 7,
17, 31 P; 99/141, 142; 127/69, 65, 71; 260/209

[56] References Cited
UNITED STATES PATENTS
3,067,067 12/1962 Etheridge et al. ............... 127/71

3,532,602 10/1970 Seidman ........................ 195/31
OTHER REFERENCES

Abdullah et al. " Heat Stability of Pullulanase," Biochem. J., P. 8p, Vol. 100, 1966.
Harada et al., " Isoamylase by Pseudomones," Applied Microbiol., Vol. 16, p. 1439– 1444, 1968
Ueda et al., " Isoamylase by Escherichia" Applied Microbiol. Vol. 15 P. 492– 496, 1967.
Whistler et al., Starch Chem. and Tech. Vol. II p. 477– 483, 1967.

*Primary Examiner*—A. Louis Monacell
*Assistant Examiner*—Gary M. Nath
*Attorney*—Browdy and Neimark ABSTRACT: The present invention makes it possible to separate short-chain-length amyloses and long-chain-length amyloses from starches by decomposing and cutting off the $\alpha$-1,6-glucoside bonds of amylopectin contained in starches by means of an $\alpha$-1,6-glucosidase to form short-chain-length amyloses differing in molecular weight from the naturally occuring amyloses and making use of the difference in molecular weight in those two shorts of amyloses.

PROCESS FOR PREPARING LONG-CHAIN AND SHORT-CHAIN AMYLOSES FROM STARCHES

This invention relates to a process for preparing long-chain and short-chain amyloses from starches.

Amylopectin, the main constituent of starch, is usually obtained with ease as glutinous rice starch or corn starch in relatively pure state. On the other hand, pure amylose does not occur naturally and involves difficulty in obtaining it because the amylose contents in various starches are limited. Recently, however, attempts have been made to separate amylopectin and amylose from starch, sometimes on an industrial scale. This trend has combined with the introduction of high-amylose varieties due to breeding of corn to attract the attention of the starch industry to the production of pure amylose.

Processes for preparing amylose hitherto reported or carried into practice invariably take the advantage of the distinction between the molecular structures of amylose and amylopectin contained in starch. Among those processes are (1) the one proposed by Schock which is to form a complex product of amylose with an aliphatic alcohol or acid and then separate and precipitate amylose from amylopectin, (2) fractional precipitation of the two in an aqueous solution of magnesium sulfate, (3) precipitation of amylose from starch gel with hydrodynamic force, or through vibration of water such as by use of ultrasonic waves, and (4) fractional precipitation of the two out of an aqueous solution without additives. These prior-art processes are all directed to separation of amylose and amylopectin, both of high molecular weights, as they are, and therefore none has proved successful in separating them with high purity and at high efficiency.

The present invention has for its object the provision of a process for preparing long-chain and short-chain amyloses from starches which comprises separating amyloses from a starch by decomposing the amylopectin which occurs in abundance in the starch through the agency of $\alpha$-1,6-glucosidase into straight-chain dextrin of a low molecular weight (or short-chain amylose), thereby giving rise to a difference in molecular weight between the decomposition product and the high-molecular natural amylose (long-chain amylose), and then efficiently fractionating the two by taking advantage of the difference in molecular weight to give long-chain and short-chain amyloses of high purity.

For selective decomposition of amylopectin, there has already been proposed a new technique for which an application is copending as U.S. Pat. application, Ser. No. 810,314, under the title of "Process for preparing low molecular weight amyloses." It is clear from the prior application that amylopectin such as of waxy corn starch is converted into low molecular weight amylose through breakage of the $\alpha$-1,6-glucoside bonds by an $\alpha$-1,6-glucosidase produced by the bacteria of the genus Pseudomonas, Aerobacter or the like. Useful $\alpha$-1,6-glucosidases for this purpose include those found as products by bacteria of the strains of *Escherichia intermedia* ATCC 21073, *Lactobacillus plantarum* ATCC 8008, *Micrococcus lysodeikticus* IFO 3333, *Nocardia corallina* IFO 3338, *Azotobacter indicus*, *Bacillus cereus*, *Erwinia aroideae*, *Agrobacterium tumefaciens*, *Leuconostoc citrovorum*, *Mycobacterium phlei*, *Pediococcus acidilactici*, *Sarcina lutea*, *Serratia plymuthica*, *Staphylococcus aureus*, *Streptococcus faecalis*, etc. Above all, the enzymes from the Lactobacillus or Nocardia bacteria are resistant to heat, and can advantageously decompose liquified starch solutions at relatively high temperatures of 50° to 60° C. while avoiding retrogradation of the starches.

The procedure used for the culture of the strains and the method of obtaining the useful enzymes therefrom are as follows.

*Pseudomonas amyloderamosa* ATCC 21262 was cultured on a medium containing 2 percent maltose, 0.2 percent sodium glutamate, 0.3 percent $(NH_4)_2HPO_4$, 0.1 percent $KH_2PO_4$, and 0.05 percent $MgSO_4 \cdot 7H_2O$. The medium was first sterilized, inoculated with the bacteria, and the strain was cultured with shaking at 30° C. for 120 hours. Then, the culture fluid was freed of the fungus body by ultracentrifuge, diluted to 75 percent concentration in acetone while being cooled thereby causing precipitation of the enzyme produced. The enzyme was centrifugally separated, frozen and dried in vacuum to a powdery form.

*Escherichia intermedia* ATCC 21073 was cultured with shaking at a rate of 125 r.p.m. after inoculation of a platinum loopful of the bacteria into 100 ml. of a medium containing 0.5 percent maltose, 0.8 percent peptone, and 0.5 percent sodium nitrate. After the culture was shaken at 30° C. for 48 hours, the culture fluid was freed of the fungus body by centrifuge and precipitated with a concentration of 15 to 48 percent in ammonium sulfate. The precipitated portion was separated and dried to obtain an enzyme preparation.

Lactobacillus strain was statically cultured at 30° C. for 4 days or 2 days on a medium containing 1 percent peptone, 0.5 percent yeast extract, 0.1 percent $K_2HPO_4$, 0.05 percent NaCl, 0.05 percent $MgSO_4 \cdot 7H_2O$, 0.001 percent $FeSO_4 \cdot 7H_2O$, 0.0002 percent $MnSO_4 \cdot 4H_2O$, 0.7 percent liquefied starch, and 0.5 percent maltose. Micrococcus strain was inoculated upon the slope of 100 ml. of a culture (at pH 7.0) containing 1 percent maltose, 0.5 percent peptone, 0.25 percent yeast extract, 0.2 percent urea, 0.2 percent meat extract, 0.1 percent $K_2HPO_4$, 0.05 percent KCl, and 0.05 percent $MgSO_4 \cdot 7H_2O$. After 1 day of the slant culture, the fluid was transferred into a 20-liter jar and cultured under aeration with shaking at a speed of about 200 r.p.m., at 30° C. for 3 days. Nocardia and other strains was cultured in a jar fermenter containing a medium which comprised 1 percent peptone, 0.5 percent yeast extract, 0.1 percent $KHPO_4$, 0.05 percent NaCl, 0.05 percent $MgSO_4 \cdot 7H_2O$, 0.001 percent $FeSO_4 \cdot 7H_2O$, and 1.4 percent liquefied starch, at 26° C. for 3 days. Bacteria of the former two strains, i.e., of the genera Lactobacillus and Micrococcus, were centrifugally collected, washed with pure water, suspended in a buffer solution of pH 7.0 containing 0.1 percent S.D.S., caused to autolyze with shaking at 30° C. for 2 days, centrifugally separated, and precipitated by 0.8 saturation with ammonium sulfate. The precipitates were then dissolved in water, dialyzed with water for 1 day, and centrifuged. The solutions thus prepared were employed as the enzyme solutions for the purpose of the invention. In the case of Nocardia and other strains, the cultured portions precipitated by 0.8 saturation with ammonium sulfate were centrifugally separated to obtain the objective enzyme solutions.

The polymerization degree of such a low molecular weight amylose as the decomposition product is in the range of 18 to 25, or only fractional when compared with the polymerization degree of natural amylose which ranges from 700 to 1,000. This difference in the degree of polymerization (or molecular weight) is taken advantage of in the present invention to fractionate the amyloses of similar structures without difficulty.

The present invention will now be described in conjunction with an embodiment thereof. The first step of the process according to the invention is for the dispersion of starch. Since starch is likely to be oxidized and decomposed at elevated temperatures, sufficient care must be taken in this stage. A temperature of 100° C. and the use of an equipment of totally enclosed, continuously operable type or heating in an inert gas are desirable, but heat up to about 130° C. may be used. For example, the multiblade continuous-heating agitator as disclosed in Japanese Pat. No. 426,978 for "Process for continuous liquefaction of starches" is used, and the starch is heated with agitation in a completely sealed vessel at 100° C. for gelatinization and dispersion. The second step is for decomposition of amylopectin in the starch with the action of $\alpha$-1,6-glucosidase. First, the dispersed solution must be cooled to 45° C. or the optimum temperature for the enzymatic activity, which may be as high as 70° C. for the Lactobacillus and Norcardin produced enzymes. Because the solution still remains highly viscous at 45° C. and retrogrades with time, it should be instantaneously cooled to this temperature and mixed with the enzyme. One way of realizing this objective is to introduce both the gelatinized starch and enzyme solutions in an atomized state into a vacuum cooler from the top thereof so that the two can be thoroughly mixed up and the mixture can be cooled down to 45° C. all at once. The starch solution mixed in this way is then dropped into a large amount of decomposition liquid in a storage tank and mixed up with agitation. This results in decomposition and a decrease in the viscosity without time allowance for retrogradation. Thus, amylopectin alone is decomposed into a straight-chain dextrin, or low molecular weight amylose. The molecular weight of this amylose is only a fraction of that of a natural amylose. The third step consists of fractionating the natural amylose (long-chain amylose) and low molecular weight amylose (short-chain amylose) by the difference of molecular weights. This may be accomplished in any of the following ways.

1. One method is by fractional precipitation in an aqueous solution by precipitating the long-chain amylose at 90°–40° C. and the short chain amylose at 5° C. or less. While the solubility of long-chain amylose at normal temperature is not more than 0.1 percent, that of molecules with polymerization degrees of 18 to 25 of short-chain amylose, the decomposition product of amylopectin, is usually between 1 and 5 percent at 10° C. and between 5 and 13 percent at 40° C. Thus, if corn starch, potato starch or the like which has an amylopectin content of 75 to 80 percent is subjected, in the form of a solution at a concentration of 10 percent, to the action of $\alpha$-1,6-glucosidase, the concentration of short-chain amylose in the decomposition solution will be about 8 percent, and the rate at which this short-chain amylose precipitates is slow at temperatures around 40° C. When the enzymatic decomposition of starch is carried out at 45° C., therefore, practically no precipitation of the low molecular weight, short-chain amylose should take place. Accordingly if the reaction solution is allowed to stand and the precipitate separated out is centrifugally removed and washed several times with water, a high molecular weight, long-chain amylose will result. Next, the remaining solution is concentrated to a 10 percent concentration and the solution is maintained at a temperature of not higher than 5° C., when most of the short-chain amylose precipitates. The precipitate upon washing with cold water yields short-chain amylose. Further, the remaining solution is dried as by vacuum concentration or atomization. Thus, the total amylose can be recovered.

2. Where necessary the butanol precipitation method may be resorted to. In this case, 1-butanol is added to a starch-enzyme decomposition solution in an amount equivalent to 4 to 7 percent of the solution. The solution is heated to a homogeneous state, and then is allowed to cool slowly over a period of 20 hours. This leads to butanol precipitation. The precipitate can be centrifuged and recrystallized for increased purity. To complete separation, it is essential to avoid the addition of excess butanol and to maintain the cooling temperature in the vicinity of 40° C. and thereby prevent deposition of short-chain amylose.

3. Fractional precipitation with the use of magnesium sulfate is also applicable. To a decomposition solution at a concentration of 10 percent, magnesium sulfate is added in an amount equivalent to 10 percent of the solution. The mixture is heated to about 90° C., cooled slowly down to 40° C., and precipitation of amylose is completed. The precipitate is separated and washed several times to remove salts therefrom. The remaining solution is concentrated to an increased concentration, cooled, precipitated, and finally the objective substance is separated.

4. A process wherein a reacted solution is heated to 70°–80° C. without the addition of any precipitant, and the crystallization and precipitation of the objective substance are promoted by means of ultrasonic energy.

As described in detail above, the solution of starch decomposed by $\alpha$-1,6-glucosidase represents a mixture of amyloses with different polymerization degrees, varying over a range of several ten folds on the basis of the polymerization degree of the lowest molecular weight constituent, and which mixture is free from amylopectin. Therefore, the mixture can be separated into long-chain amylose and short-chain amylose through direct fractional precipitation, thus yielding highly pure amyloses of dissimilar polymerization degrees. The precipitational separation may be promoted by the addition of an alcohol or salt or by the application of sound wave energy. It is further possible to rely upon a supercentrifuge for the separation.

Thus, the present invention is characterized in that it renders it easy to obtain natural amyloses which have hardly been separated heretofore, in the form of low molecular weight amyloses with regular and uniform chain lengths.

EXAMPLE 1A

Purified corn starch in the form of a 15 percent aqueous suspension was adjusted to pH 5–6, forced into a continuous multiblade agitation column, heated rapidly to 100° C. with the supply of steam, and was agitated for gelatinization. The gelatinized solution, while being readjusted to a concentration of 10 percent and pH 5–6, was injected into a vacuum cooler and was thereby cooled quickly to 50° C. At the same time, a solution of the $\alpha$-1,6-glucosidase produced by the bacteria of the genus Aerobacter U.S. Pat. application, Ser. No. 733,325 was injected into the vacuum cooler at a rate of 50 units per gram of the starch, and was rapidly and thoroughly mixed with the gelatinized solution. Upon cooling and mixing, the solution was immediately fed into a decomposition tank kept at 45° C. and was completely mixed up with stirring. With the average residence time in the decomposition tank set for 1 hour, the mixture was continuously fed into the main reaction tank, where it was kept at 45° C. for about 40 hours. In the cases where soluble matter precipitated during the reaction at 45° C., the reaction mixture was heated to 80° C. for 10 to 15 minutes, and the precipitate was centrifugally removed, and this precipitate (I) was washed with cold water. Next, the remainder of the decomposition solution at about 80° C. was slowly cooled down to 50° C. with stirring over a period of 20 to 40 hours. The resulting solution was precipitated and separated through a centrifuge. This precipitate (II) was washed twice with cold water. The precipitates I and II thus obtained were dehydrated and dried solid. On the other hand, the supernatant fluid left behind was cooled to downwards of 5° C., stirred for 12 hours to precipitate short-chain amylose, centrifuged, and washed with cold water in the similar way. The remaining supernatant fluid was concentrated in a vacuum and dried. The precipitates I, II were long-chain amylose with a polymerization degree of 750, and the combined yield was 20 percent. The secondary precipitate, which was short-chain amylose, had a polymerization degree of 30, and the yield was 65 percent. The remainder with a polymerization degree of 20 was obtained at a yield of 10 percent.

EXAMPLE 1B

In the same manner as described in example 1A, the starch was gelatinized at 100° C. and sprayed with a concentration of 10 percent, while being adjusted in the pH of 5–6, into a vacuum for rapid cooling. Together with the starch, an Escherichia enzyme solution was injected through a nozzle at a rate of 40 units per gram of the starch into a preliminary reaction vessel at 45° to 50° C. to decrease the degree of gelatinization. The mixture was continuously transferred into a reaction vessel, where it was reacted at 45° C. for 40 hours. Upon completion of the reaction, the solution was gradually cooled to 50° C., and at that temperature the precipitate I was centrifugally separated. The separated solution was slowly cooled down to 5° C. and at that point again the precipitate II was centrifugally separated. These precipitates were separately washed with water and dried in a vacuum or by spraying. The final remaining solution and washings were concentrated in a vacuum and then dried by spraying, when a test specimen III resulted. The precipitate I represented a high molecular amylose and the precipitates II and III were low molecular amyloses, with yields of 17 percent, 63 percent, and 15 percent, respectively.

EXAMPLE 1C

The same liquefied starch solution as used in example 1A was sprayed into a vacuum cooler so that it could be rapidly cooled to 70° C. with pH 6.0, and either Lactobacillus or Nocardia enzyme was continuously introduced thereinto at a rate of 40 units per gram of the starch. The uniformly mixed solution was agitated in a preliminary reaction vessel at about 60° C. for 0.5 to 1 hour, and then it was continuously transferred into a main reaction vessel, where the reaction was carried out at 55° C. for 45 hours. With the same separating procedure as resorted to in example 1B, three types of test specimens I, II and III were obtained with yields and polymerization degrees substantially comparable to those attained in the preceding example.

EXAMPLE 1D

As for enzymes produced by the strains mentioned elsewhere in this specification excepting the strains of the genera Aerobacter, Pseudomonas, Nocardia, and Lactobacillus, the enzymes were separated by salting out with ammonium sulfate, and then obtained through dialysis. The resulting enzymes were treated in the same way as in example 1A and gave almost identical results.

EXAMPLE 2

Potato starch in the form of an aqueous suspension with a concentration of 10 percent was adjusted to pH 5.0, and was gelatinized and dispersed in the same manner as described in example 1. Then, while the pH was being adjusted to 4.5, it was cooled and a Pseudomonas enzyme was added at a rate of 50 units per gram of the starch. The reaction was carried out at 45° C., and a precipitate (I) formed in 30 hours was centrifugally separated and washed with water. The remaining solution was cooled down to 5° C., allowed to stand for 12 hours, and the resulting precipitate (II) was separated, cooled and washed with cold water in the same manner as above described. The remaining solution was concentrated and dried by atomization. The total recovery rate was 90 percent on the basis of dry starch. The polymerization degrees of the products were as table below.

| | Polymn. degree | Yield |
|---|---|---|
| Precipitate (I) (long-chain amylose) | 850 | 15% |
| Precipitate (II) (short-chain amylose) | 35 | 35% |
| Residual dry matter | 25 | 40% |

EXAMPLE 3

A. To 1,000 ml. of the solution of the enzymatically decomposed starch according to example 2 was added 55 ml. of 1-butanol. The mixture was heated to 85° C. and dissolved with stirring, and then the solution was slowly cooled down to 40° C. over 30 hours. The first precipitate thereby deposited was separated, thoroughly washed with water, and dried. The remaining solution, upon the addition of 10 ml. of butanol, afforded the second precipitate at 5° C. or a lower temperature. This was again separated and washed with water in the similar manner. The first butanol precipitate in this example amounted to 130 g. and exhibited a mean polymerization degree of 750. The second precipitate amounted to 54 g. and the mean polymerization degree was 31. The remainder of the solution upon drying yielded 5 g. with a mean polymerization degree of 20.

B. To 1,000 ml. of the decomposed solution in example 2 was added 100 g. of magnesium sulfate. The mixture was melted by heating to 90° C. The resultant upon slow cooling to 40° over 24 hours gave 12 g. of natural amylose. The remaining solution was concentrated to a concentration of 10 percent, cooled, and centrifuged 12 hours afterwards. The precipitates were washed with water to remove salts therefrom, when long-chain and short-chain amyloses with high degrees of purity were obtained.

C. The decomposed solution according to example 2 was concentrated to a 12 percent concentration, and, while it was being slowly cooled from 85° C., it was subjected to ultrasonic waves. The precipitation speed thus could be shortened to a period of several hours. The yields after cooling to 40° C. over 3 hours were 10 percent of long-chain amylose and 60 percent of short-chain amylose upon concentration.

What is claimed is:

1. A process for preparing long-chain amylose and short-chain amylose and separating one from the other, which comprises: liquefying starch at a temperature between 100° and 130° C., cooling the resulting liquefied starch to 45°–70° C.; adding to said liquefied starch α-1,6-glucosidase produced from bacteria in an amount sufficient to decompose substantially all the amylopectin contained in the starch into amylose; precipitating said long-chain amylose by cooling the resulting mixture to about 45°–40° C.; separating the precipitate of said long-chain amylose; then precipitating said short-chain amylose by cooling the residual solution below 5° C.; and separating the precipitate of said short-chain amylose.

2. A process in accordance with claim 1 in which said cooling of the liquefied starch to 45°–70° C. is done quickly and simultaneous with the addition of said α-1,6-glucosidase.

3. A process in accordance with claim 2 wherein said simultaneous cooling and said addition of said α-1,6-glucosidase is carried out by introducing both said gelatinized starch and said enzyme in an atomized state into a vacuum cooler to effect through mixing and cooling.

4. A process in accordance with claim 2 wherein said liquefied starch has a concentration of about 10 percent, and wherein after precipitation of said long-chain amylose, the remaining solution is concentrated to about 10 percent starch concentration.

5. A process in accordance with claim 2 wherein said amount of α-1,6-glucosidase sufficient to decompose substantially all said amylopectin comprises about 40–50 units per gram of starch and decomposition is carried out for about 30–45 hours.

6. A process in accordance with claim 2 wherein after the amylopectin has been converted to amylose by said α-1,6-glucosidase, the liquefied amylose is reheated to about 70°–90° C. prior to effecting precipitation of said long-chain amylose by cooling to about 45°–40° C.

7. A process for preparing long-chain and short-chain amyloses as defined in claim 1 in which the separation of the long-chain amyloses and short-chain amyloses is attained by adding butanol to the amylose mixture prior to cooling to 45°–40 C. and then adding additional butanol to said residual solution prior to cooling to below 5° C.

8. A process for preparing long-chain and short-chain amyloses as defined in claim 1 in which the separation of the long-chain amyloses and short-chain amyloses is attained by adding magnesium sulfate to the amylose mixture prior to cooling to 45°–40° C.

9. A process for preparing long-chain and short-chain amyloses from starches as defined in claim 1 in which the fractional precipitation of the long-chain and short-chain amyloses is promoted by subjecting the amylose mixture during cooling to ultrasonic waves.

10. A process for preparing long-chain and short-chain amyloses from starches as defined in claim 1 in which the starch is liquefied with heat in a totally enclosed, continuously operable equipment.

11. A process for preparing long-chain and short-chain amyloses from starches as defined in claim 1 in which the α-1,6-glucosidase to be used is produced by bacteria selected from the group consisting of Escherichia, Lactobacillus, Micrococcus, Nocardia, Azotobacter, Bacillus, Erwinia, Agrobacterium, Leuconostoc, Mycobacterium, Pediococcus, Sarcina, Serratia, Staphylococcus, Streptococcus, and Pseudomonas strains.

12. A process for preparing long-chain and short-chain amyloses from starches as defined in claim 11 in which, in selectively using a heat-resistant enzyme from bacteria of the genus Lactobacillus, Nocardia or the like as the α-1,6glucosidase, the slurry of liquefied starch is maintained at a temperature of 60°–70° C. and a pH value of 5–7, and the particular enzyme is added, and then the mixture is reacted at 45°–55° C.

13. A process for preparing long-chain and short-chain amyloses from starches as defined in claim 11 in which, in selectively using an enzyme from Pseudomonas bacteria as the α-1,6-glucosidase, the slurry of liquefied starch is adjusted to pH 3–5.5.

* * * * *

UNITED STATES PATENT OFFICE
CERTIFICATE OF CORRECTION

Patent No. 3,632,475                 Dated January 4, 1972

Inventor(s) Kaname SUGIMOTO et al.

It is certified that error appears in the above-identified patent and that said Letters Patent are hereby corrected as shown below:

In the ABSTRACT, last line, change "shorts" to read --sorts--

Column 1, line 49, change "any loses" to read --amyloses--

Column 4, line 34, delete "soluble" and insert --insoluble--.

Signed and sealed this 6th day of June 1972.

(SEAL)
Attest:

EDWARD M. FLETCHER, JR.                 ROBERT GOTTSCHALK
Attesting Officer                       Commissioner of Patents